US010726828B2

(12) United States Patent
Fukuda et al.

(10) Patent No.: US 10,726,828 B2
(45) Date of Patent: *Jul. 28, 2020

(54) GENERATION OF VOICE DATA AS DATA AUGMENTATION FOR ACOUSTIC MODEL TRAINING

(71) Applicant: INTERNATIONAL BUSINESS MACHINES CORPORATION, Armonk, NY (US)

(72) Inventors: Takashi Fukuda, Yokohama (JP); Osamu Ichikawa, Yokohama (JP); Gakuto Kurata, Tokyo (JP); Masayuki Suzuki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/609,665

(22) Filed: May 31, 2017

(65) Prior Publication Data

US 2018/0350347 A1 Dec. 6, 2018

(51) Int. Cl.
*G10L 15/06* (2013.01)
*G10L 15/05* (2013.01)
*G10L 21/003* (2013.01)
*G10L 25/78* (2013.01)

(52) U.S. Cl.
CPC .......... *G10L 15/063* (2013.01); *G10L 21/003* (2013.01); *G10L 15/05* (2013.01); *G10L 2025/783* (2013.01)

(58) Field of Classification Search
None
See application file for complete search history.

(56) References Cited

U.S. PATENT DOCUMENTS

| 6,208,960 B1 | 3/2001 | Gigi |
| 6,349,277 B1 | 2/2002 | Kamai et al. |
| 6,832,192 B2 | 12/2004 | Yamada |
| 7,272,556 B1 * | 9/2007 | Aguilar ................. G10L 19/093 704/201 |

(Continued)

FOREIGN PATENT DOCUMENTS

WO 9323727 A1 11/1993

OTHER PUBLICATIONS

IBM, "List of IBM Patents or Patent Applications Treated as Related (Appendix P)," May 22, 2018, p. 1-2.

(Continued)

*Primary Examiner* — Richa Mishra
(74) *Attorney, Agent, or Firm* — Erik K. Johnson

(57) ABSTRACT

A method, computer system, and a computer program product for generating a plurality of voice data having a particular speaking style is provided. The present invention may include preparing a plurality of original voice data corresponding to at least one word or at least one phrase is prepared. The present invention may also include attenuating a low frequency component and a high frequency component in the prepared plurality of original voice data. The present invention may then include reducing power at a beginning and an end of the prepared plurality of original voice data. The present invention may further include storing a plurality of resultant voice data obtained after the attenuating and the reducing.

15 Claims, 7 Drawing Sheets

(56) References Cited

U.S. PATENT DOCUMENTS

| | | | |
|---|---|---|---|
| 8,645,135 B2 | 2/2014 | Hagen et al. | |
| 9,069,757 B2 | 6/2015 | Yassa | |
| 2003/0179888 A1* | 9/2003 | Burnett | G10L 21/0208 |
| | | | 381/71.8 |
| 2003/0216907 A1 | 11/2003 | Thomas | |
| 2010/0017203 A1* | 1/2010 | Archibald | G10L 25/78 |
| | | | 704/208 |
| 2010/0246847 A1* | 9/2010 | Johnson, Jr. | H04R 1/1041 |
| | | | 381/74 |
| 2012/0022676 A1* | 1/2012 | Ishikawa | G10L 21/04 |
| | | | 700/94 |
| 2013/0060567 A1 | 3/2013 | Konchitsky | |
| 2014/0278420 A1 | 9/2014 | Meloney et al. | |
| 2015/0095026 A1 | 4/2015 | Bisani et al. | |
| 2015/0120308 A1* | 4/2015 | Leistikow | G10H 1/366 |
| | | | 704/500 |
| 2018/0254034 A1* | 9/2018 | Li | G10L 13/02 |

OTHER PUBLICATIONS

Fukuda et al., "Generation of Voice Data as Data Augmentation for Acoustic Model Training," Application and Drawings, filed Dec. 28, 2017, 32 Pages, U.S. Appl. No. 15/857,584.

Harun et al., "Investigation of the Effect of Low Frequency Components of Sound to Speech Intelligibility," The Journal of the Acoustical Society of America, 2007, p. 1-3, vol. 122, Issue 5, Abstract Only, http://asa.scitation.org/doi/abs/10.1121/1.2942846, Accessed on May 23, 2017.

Hillenbrand et al., "Acoustic Correlates of Breathy Vocal Quality: Dysphonic Voices and Continuous Speech," Journal of Speech and Hearing Research, Apr. 1996, p. 311-321, vol. 39, American Speech-Language-Hearing Association.

Pfitzinger, "Unsupervised Speech Morphing between Utterances of any Speakers," Proceedings of the 10th Australian International Conference on Speech Science & Technology, Dec. 8-10, 2004, p. 545-550, Australian Speech Science & Technology Association Inc., Macquarie University, Sydney.

Schlette, "The Complete Guide to Audio Pass Filters: High, Low & Everything In-Between," The Pro Audio Files, Nov. 18, 2013, p. 1-4, https://theproaudiofiles.com/audio-pass-filters/, Accessed on May 23, 2017.

Vizz.Co, "Best Voice Changer Calling Apps to Change Voice During a Call," Vizz.Co Mobile Apps Magazine, Dec. 25, 2014, p. 1-4, Vizz Media, http://www.vizz.co/voice-changer-calling/, Accessed on May 23, 2017.

Yoo et al., "Robust Voice Activity Detection Using the Spectral Peaks of Vowel Sounds," ETRI Journal, Aug. 2009, p. 451-453, vol. 31, No. 4.

* cited by examiner

GENERATION OF VOICE DATA AS DATA AUGMENTATION FOR ACOUSTIC MODEL TRAINING

BACKGROUND

The present invention, generally, relates to data augmentation technique, more particularly, to technique for generating voice data having a particular speaking style.

It has been known that automatic speech recognition (ASR) systems degrade its performance when acoustic environment in target utterances is different from environment for the training data. Such acoustic environment includes not only a type of noises but also a speaking style. Spontaneous speech such as a conversation, very fast and slow utterances and ambiguous pronunciations are well known as harmful speaking styles for speech recognition.

SUMMARY

Embodiments of the present invention disclose a method, computer system, and a computer program product for generating a plurality of voice data having a particular speaking style. The present invention may include preparing a plurality of original voice data corresponding to at least one word or at least one phrase is prepared. The present invention may also include attenuating a low frequency component and a high frequency component in the prepared plurality of original voice data. The present invention may then include reducing power at a beginning and an end of the prepared plurality of original voice data. The present invention may further include storing a plurality of resultant voice data obtained after the attenuating and the reducing.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and program product for generating a plurality of voice data having a particular speaking style, in which a plurality of resultant voice data is generated for data augmentation and can be used to train an acoustic model for speech recognition.

Figure 1:
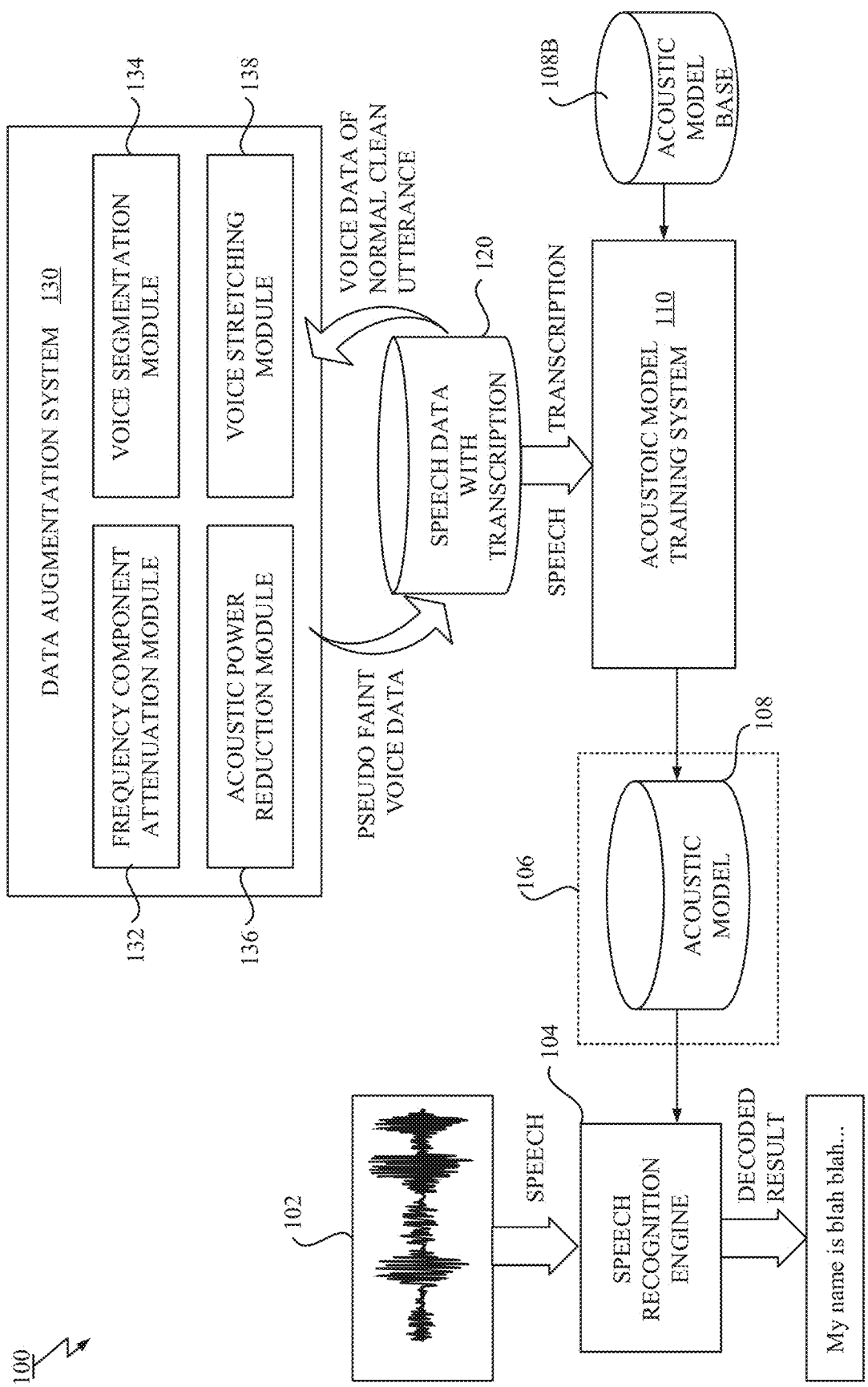
FIG. 1 illustrates a block diagram of a speech recognition system that includes a data augmentation system for augmenting training data for an acoustic model according to an exemplary embodiment of the present invention.

Referring to FIG. 1, a block diagram of a speech recognition system that includes a data augmentation system according to an exemplary embodiment of the present invention is illustrated. As shown in FIG. 1, the speech recognition system 100 may include a speech recognition engine 104 for performing speech recognition based on a speech recognition model 106; an acoustic model training system 110 for training an acoustic model 108 that constitutes the speech recognition model 106; and a data augmentation system 130 for augmenting training data for the acoustic model 108.

The speech recognition engine 104 is configured to convert from input speech signal into a text. The speech recognition engine 104 may receive speech signals digitalized by sampling analog audio input 102, which may be input from a microphone for instance, at a predetermined sampling frequency and a predetermined bit depth. The speech recognition engine 104 may predict most plausible speech contents for the input speech signals based on the speech recognition model 106 to output decoded results.

In a particular embodiment, the speech recognition engine 104 may include feature extraction functionality, which extracts acoustic features from the received speech signal by any known acoustic feature analysis to generate a sequence of the extracted acoustic features. Such acoustic features may include, but not limited to, MFCC (Mel Frequency Cepstral Coefficient), LPC (Linear Predictive Coding) Coefficient, PLP (Perceptual Liner Prediction) Cepstral Coefficient, log Mel spectrum, raw input features, or any combinations thereof. The acoustic features may further include dynamical features such as delta features and delta-delta features of the aforementioned acoustic features.

The speech recognition model 106 includes the acoustic model 108. The acoustic model 108 is a model representing relationship between input acoustic features and linguistic units (e.g. words) that constitutes a speech. The acoustic model 108 is a target of training by the acoustic model training system 110.

In a particular embodiment, the acoustic model 108 may be an artificial neural network based acoustic model. The neural network for the acoustic model 108 may be based on any one of known neural network architectures, including a hybrid NN-HMM model, other type of NN-HMM model that is based on tandem or "bottleneck feature" approach. In the hybrid NN-HMM model, the neural network may be used to directly compute observation probability distribution for each HMM state instead of standard Gaussian Mixture Models (GMM) in the GMM/HMM system. In tandem or "bottleneck feature" approach, the neural network may be used to extract features as input for a subsequent system such as a standard GMM/HMM system and other neural network based system having different architecture or structure from the neural network in place of or in addition to standard acoustic features.

Although omitted in FIG. 1, the speech recognition model 106 may include a language model, which is a model representing probability distribution of word sequence and may be, but not limited to, n-gram model or neural network based model.

The speech recognition engine 104 finds a word sequence with maximum likelihood by using the speech recognition model 106 (including the acoustic model 108) based on the sequence of the acoustic features, and outputs the word sequence found as the decoded result.

The acoustic model training system 110 may perform training process by using given training data stored in the speech data 120 to build the acoustic model 108, which may be used by the speech recognition engine 104. In the described embodiment, the speech data 120 with transcription may be provided as the training data. The speech data 120 may include a plurality of utterances and corresponding transcriptions. The speech data 120 may be stored in an internal or external storage device operatively coupled to a processing circuitry.

It is known that automatic speech recognition (ASR) systems may degrade its performance when acoustic environment in target utterances is different from environment for the training data. Such acoustic environment may include not only a type of noises but also a speaking style. Spontaneous speech (e.g., conversation), very fast and slow utterances and ambiguous pronunciation may be well known as harmful speaking styles for speech recognition. In addition to these factors, a certain voice may have a particular speaking style that is a style of indistinctly muttering with a low volume is found to be one of difficult utterances for speech recognition. Such low volume indistinctive muttering is referred to as "faint voice" herein. Such faint voice is rarely observed in the training data in comparison with normal clear utterances. On the other hand, the faint voice can be sometimes observed in a voice search task and/or a situation where a speaker unsurely (uncertainly) utter during a conversation.

Figure 2A:
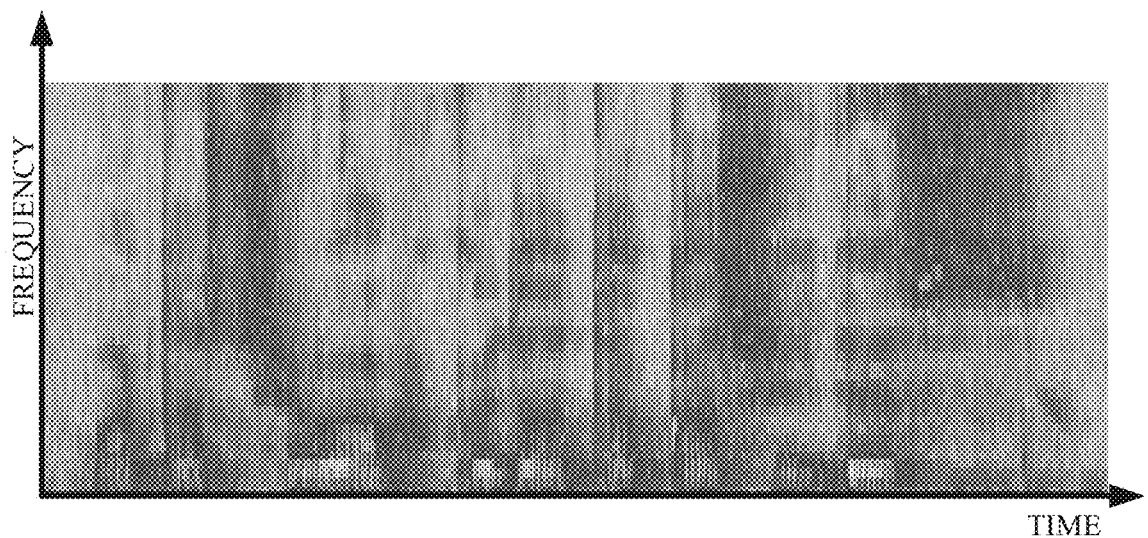
FIGS. 2A and 2B show a comparison of spectrograms between a normal utterance and a faint voice corresponding to a sample sentence.
Figure 2B:
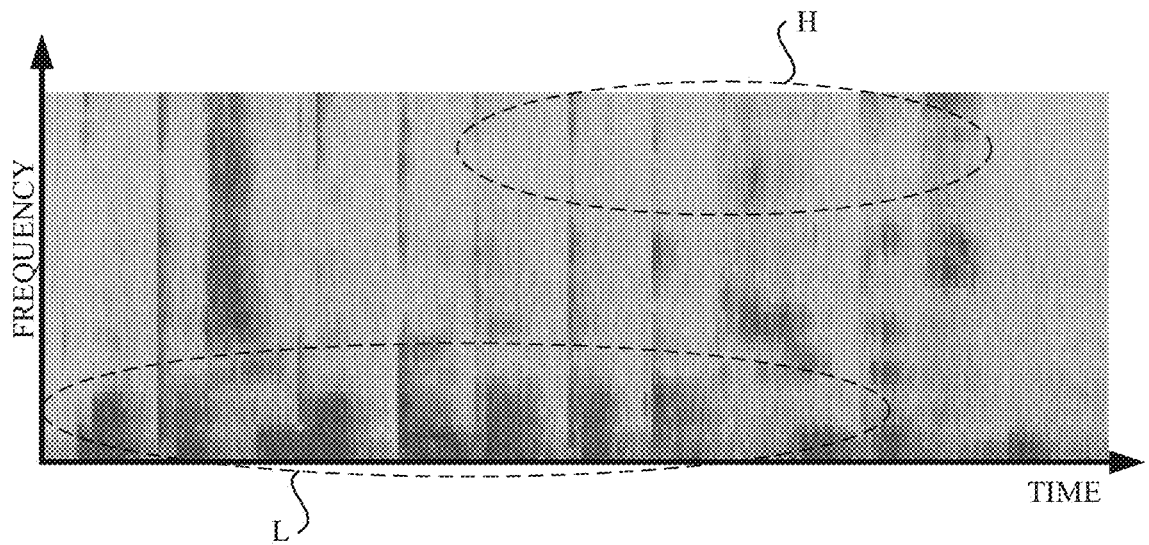
Figure 3:
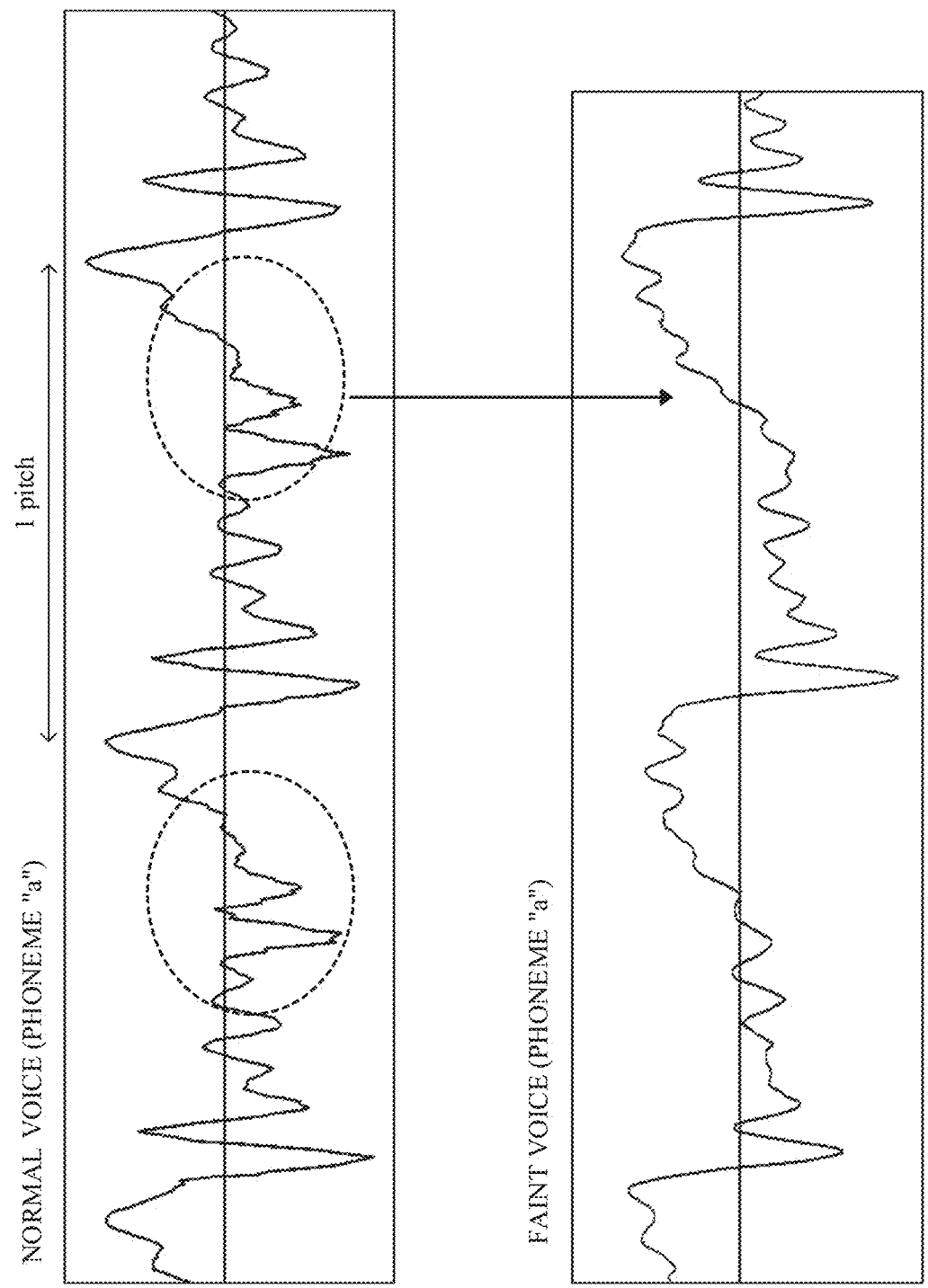
FIG. 3 describes a comparison of waveforms between a normal utterance and a faint voice corresponding to a same phoneme.

Hereinafter, referring to FIGS. 2A, 2B, and FIG. 3, characteristics of the aforementioned "faint voice" uttered by human are described. FIGS. 2A and 2B show a comparison of spectrograms between a normal utterance (A) and a faint voice (B), both of which correspond to a same sample sentence. The sample sentence is a short speech of self-introduction in English. The normal utterance has a speaking style, in which a speaker read the sample sentence at normal speed. FIG. 3 describes a comparison of waveforms between a normal utterance and a faint voice, both of which correspond to the phoneme "a".

The faint voice may have several characteristics that can be distinguished from the normal voice.

Firstly, the faint voice may be very low power since a muscle that opens and closes a vocal cord extremely relaxes during an utterance of the faint voice.

Secondly, low frequency component L may be attenuated in the faint voice as can be understood by comparing FIG. 2A with FIG. 2B. It is known that a vibration of a vocal cord may be approximated to asymmetric triangular waves as illustrated in FIG. 3. The sharpness of the asymmetric triangular waves may be reduced by uttering very quietly. Marked portions in the waveform of the normal voice and corresponding portions in that of the faint voice shown in FIG. 3 may indicate decrease in sharpness of asymmetric triangular waves in the faint voice in comparison with the normal voice. As a result, low frequency components of spectra, such as formant, may be reduced.

Thirdly, a high frequency component H may be attenuated in the faint voice as can be understood by comparing FIG. 2A with FIG. 2B. Since airflow during the faint voice is small, spectral magnitudes of fricative and stop consonants that have high frequency component may be reduced.

Fourthly, speech power at the beginning and the end of a word or a short phase in the faint voice may be attenuated since controlling airflow is unstable due to low-volume utterance.

Fifthly, the faint voice may be slower in comparison with a normal utterance.

Sixthly, harmonics still exist in the faint voice, which is characteristic that may be distinguished from whisper speaking style.

In order to improve performance of speech recognition for such faint voice, the data augmentation system 130 according to the exemplary embodiment of the present invention may be configured to generate voice data having a particular speaking style, that is pseudo voice data with similar characteristics to the faint voice, by transforming from an original voice data of normal utterances.

Referring further to FIG. 1, a more detailed block diagram of the data augmentation system 130 is also described. The data augmentation system 130 may read an input original voice data stored in the speech data 120 to generate one or more pseudo faint voice data. The input original voice data is voice data that may correspond to a normal clean utterance having a normal speaking style and may be originally given for acoustic model training in the speech data 120. The resultant pseudo faint voice data would be stored back to the speech data 120 for acoustic model training together with the original voice data stored in the speech data 120.

As shown in FIG. 1, the data augmentation system 130 may include a frequency component attenuation module 132 for attenuating particular frequency components in given voice data; a voice segmentation module 134 for dividing given voice data into one or more segmented voice data; an acoustic power reduction module 136 for reducing acoustic power in given voice data; and a voice stretching module 138 for making given voice data slower.

The frequency component attenuation module 132 may be configured to attenuate low frequency component and high frequency component in the given voice data. In particular embodiments, the input original voice data of the normal clean utterance or intermediate data originating from the input original voice data (e.g. the segmented voice data divided by the voice segmentation module 134 from the input original voice data) may be given for the frequency component attenuation module 132.

The low and high frequency components may be attenuated by applying a bandpass filter to the given voice data. The bandpass filter may have a passband other than particular high and low frequency components. The high frequency component being attenuated may include a component greater than or equal to 4 kHz, which may roughly correspond to fricative (/s/, /f/, /v/, /z/) and stop (e.g., /b/, /p/, /d/, /k/, /g/, /t/) consonants. The low frequency component being attenuated may include a component less than or equal to 1.5 kHz, which may roughly correspond to first formants of human voice.

The voice segmentation module 134 may be configured to divide given voice data into one or more segmented voice data (speech segments) in a manner such that each segmented voice data includes a part corresponding to a word or a short phrase that is included in utterances of the given voice data. One or more segmented voice data, each of which corresponds to at least a part (a word or a short phrase) of the normal clean utterance, may be prepared in order to generate pseudo faint voice. In particular embodiments, the input original voice data or intermediate data originating from the input original voice data (e.g. the voice data after applying frequency attenuation by the frequency component attenuation module 132) may be given for the voice segmentation module 134.

In a particular embodiment, split points for each segmented voice data may be detected by detecting voice activities with a threshold in the given voice data, based on any known VAD (Voice Activity Detection) techniques. However, segmentation of the given voice data may not be limited to aforementioned example. In other embodiments, voice data may correspond to a word or a short phrase can be extracted by using any known forced alignment techniques, by which alignment between a word (or a phrase) and a segment in the given voice data can be made.

The acoustic power reduction module 136 may be configured to reduce acoustic power at the beginning and the end of the given voice data, which is the segmented voice data prior to or posterior to the frequency attenuation in particular embodiments. The acoustic power at the beginning and the end of word or short phrase may be reduced by applying a window function to the given voice data. The window functions being applied may have a smooth bell-shaped curve with a certain interval according to the length of the word or the short phrase. The window function may include cosine windows such hamming window, Hann window, Blackman windows, but not named a few.

The voice stretching module 138 may be configured to make given voice data slower. In an embodiment, the voice stretching module 138 may stretch a vowel in the given voice data longer. In a particular embodiment, duration of each vowel in the given voice data may be stretched so as to tune speech speed (=the number of phones/the length of the utterance) to be rate that is randomly selected from predetermined range for each utterance. In particular embodiments, the input original voice data or intermediate data originating from the input original voice data (e.g. segmented voice data after applying frequency attenuation and/or power reduction) may be given for the voice stretching module 138.

The resultant voice data that may be obtained after each segmented voice data being processed by the frequency component attenuation module 132, the acoustic power reduction module 136 and the voice stretching module 138 may be stored in the speech data 120 as training data for the acoustic model 108. The resultant voice data may be a pseudo faint voice data that has a style of indistinctly muttering with low volume.

Note that application of the voice stretching by the voice stretching module 138 may be preferable to make the resultant voice data closer to the characteristic of the faint voice data but can be omitted in other embodiments. In addition, the sequence of applications of the frequency attenuation by the module 132, the segmentation by the module 134, the acoustic power reduction by the module 136 and the voice stretching by the module 138 may not be limited. Note that each voice data included in the input voice data may be subjected to frequency attenuation prior to or posterior to the input voice data being divided. Furthermore, the power reduction may be performed prior to or posterior to the frequency attenuation.

Since the input original voice data (e.g., an utterance) may be associated with label information (e.g. a transcription corresponding to the utterance), the resultant pseudo faint voice data (e.g. corresponding to a part of the utterance) and label information that may be a part of the label information associated with the input original voice data (e.g. a part of transcription corresponding to the part of the utterance) can be used to train the acoustic model 108 for speech recognition.

The acoustic model training system 110 according to the exemplary embodiment may be configured to train the acoustic model 108 for speech recognition by using the resultant pseudo faint voice data. In a particular embodiment, the acoustic model training system 110 may perform training of the acoustic model 108 from scratch by using training data including the resultant pseudo faint voice data. In other particular embodiment, the acoustic model training system 110 may perform training of the acoustic model 108 by performing adaptation of a trained-acoustic model base 108B, which may be a general purpose acoustic model having been already trained, using the resultant pseudo faint voice data.

In particular embodiments, each of system 104, 110 and 130, and each of modules 132, 134 and 136 of the data augmentation system 130 described in FIG. 1 may be, but not limited to, implemented as a software module including program instructions and/or data structures in conjunction with hardware components such as a processor, a memory, etc.; as a hardware module including electronic circuitry; or as a combination thereof. These systems 104, 110 and 130, and module 132, 134 and 136 described in FIG. 1 may be implemented on a single computer device such as a personal computer and a server machine or over a plurality of devices such as a computer cluster of the computer devices in a distributed manner. The speech data 120 may be provided by using any internal or external storage device or medium, to which a processing circuitry of a computer system implementing the data augmentation system 130 is operatively coupled.

Hereinafter, referring to FIG. 4, a flowchart depicting a process for generating pseudo faint voice data by transforming from a normal voice data according to an exemplary embodiment of the present invention is shown. Note that the process shown in FIG. 4 may be performed by a processing circuitry such as a processing unit of a computer system that implements the data augmentation system 130 shown in FIG. 1.

Figure 4:
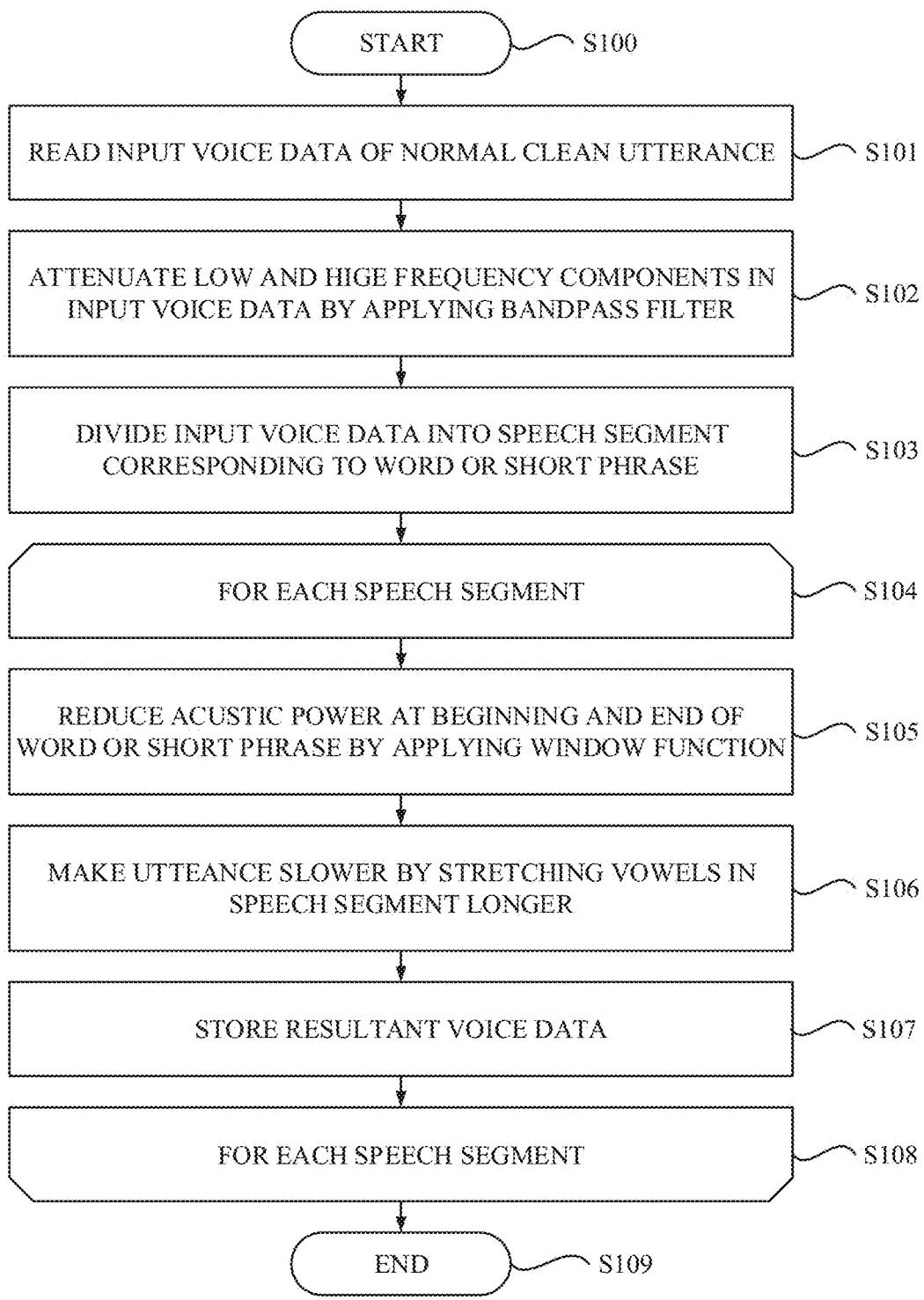
FIG. 4 is a flowchart depicting a process for generating pseudo faint voice data by transforming from a normal voice data according to an exemplary embodiment of the present invention.

The process shown in FIG. 4 may begin at step S100 in response to receiving a request for data augmentation. Note that the process shown in FIG. 4 is described to be process for given input voice data of one utterance. Thus, the process shown in FIG. 4 may be performed for each voice data of one or more utterance stored in the speech data 120.

At step S101, the processing unit may read input voice data corresponding to one normal clean utterance. The one normal clean utterance may correspond to one or more words constituting a sentence (e.g. "My name is xxxxx.").

Figure 5A:
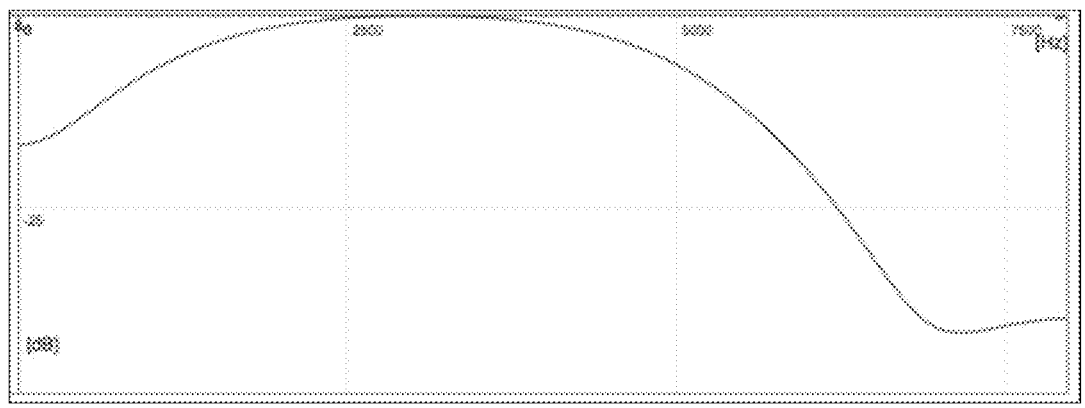
FIG. 5A depicts a characteristic of bandpass filter applied to given voice data according to the exemplary embodiment of the present invention.

At step S102, the processing unit may attenuate low and high frequency components in the input voice data by applying bandpass filter to the input voice data. Characteristics of an example of the bandpass filter is shown in FIG. 5A. In the example shown in FIG. 5A, the bandpass filter attenuates contents approximately above 4 kHz and contents approximately below 1.5 kHz, allowing frequencies within a passband that is greater than 1.5 kHz and is less than 4 kHz to pass through the filter. By attenuating the high and low frequency components in the input voice data, a situation where sharpness of asymmetric triangular waves in the faint voice are decreased and spectral magnitudes of fricative and stop consonants are reduced can be imitated.

At step S103, the processing unit may divide the input voice data into one or more segmented original voice data (1st, 2nd, . . . speech segments) in a manner such that each segmented original voice data includes a part corresponding to a word or a short phrase (e.g., "my", "name") in the utterance of the input voice data (e.g. "My name is xxxxx."). As described above, the input voice data may be divided by detecting voice activities in the input voice data with a threshold based on any known VAD (Voice Activity Detection) techniques.

After obtaining one or more segmented original voice data from the input voice data, the processing from step S104 to step S108 may be performed repeatedly for each segmented original voice data (each speech segment).

Figure 5B:
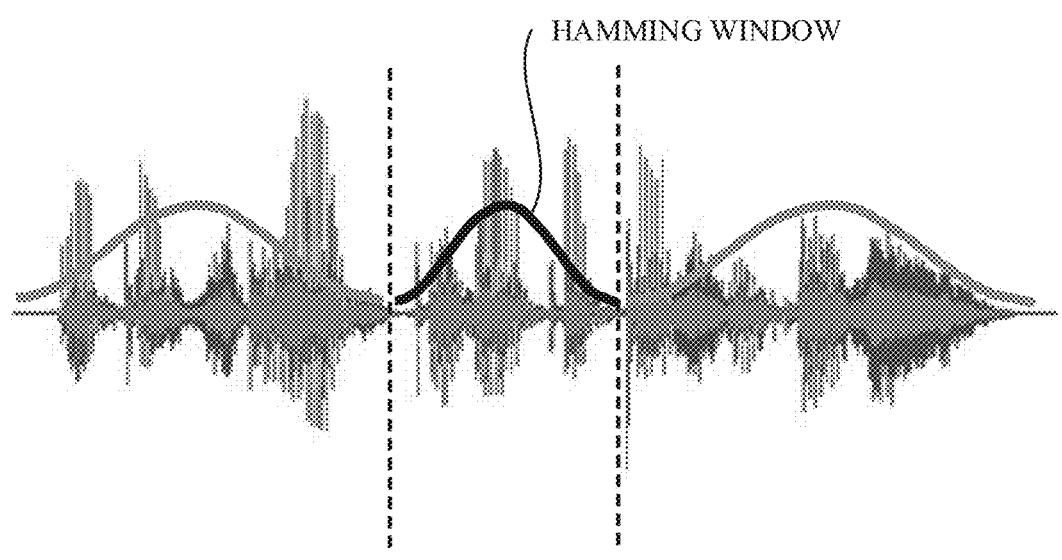
FIG. 5B describes way of applying a hamming window to a speech segment according to the exemplary embodiment of the present invention.

At step S105, the processing unit may reduce acoustic power at the beginning and the end of the speech segment by applying a window function having a smooth bell-shaped curve with a certain interval that is according to the length of the word or the short phrase. The example of the window function that is a hamming window and way of applying the hamming window to the speech segment are shown in FIG. 5B.

The hamming window function can be expressed as follows:

$$h_A(n) = 0.54 + 0.46\cos\left(\frac{2\pi n}{N_A - 1}\right),$$

where the $N_A$ represents the number of the samples in A-th speech segment.

As shown in FIG. 5B, acoustic power at the beginning and acoustic power at the end of the speech segment are reduced in order to imitate a situation where controlling airflow is unstable due to low-volume utterance in the faint voice.

At step S106, the processing unit may make each speech segment slower by stretching vowels in each speech segment longer. At step S107, the processing unit may store a resultant pseudo faint voice data into the speech data 120.

After performing the processing from step S104 to step S108 repeatedly for each speech segment, the process may proceed to step S109 to end the process.

Figure 6:
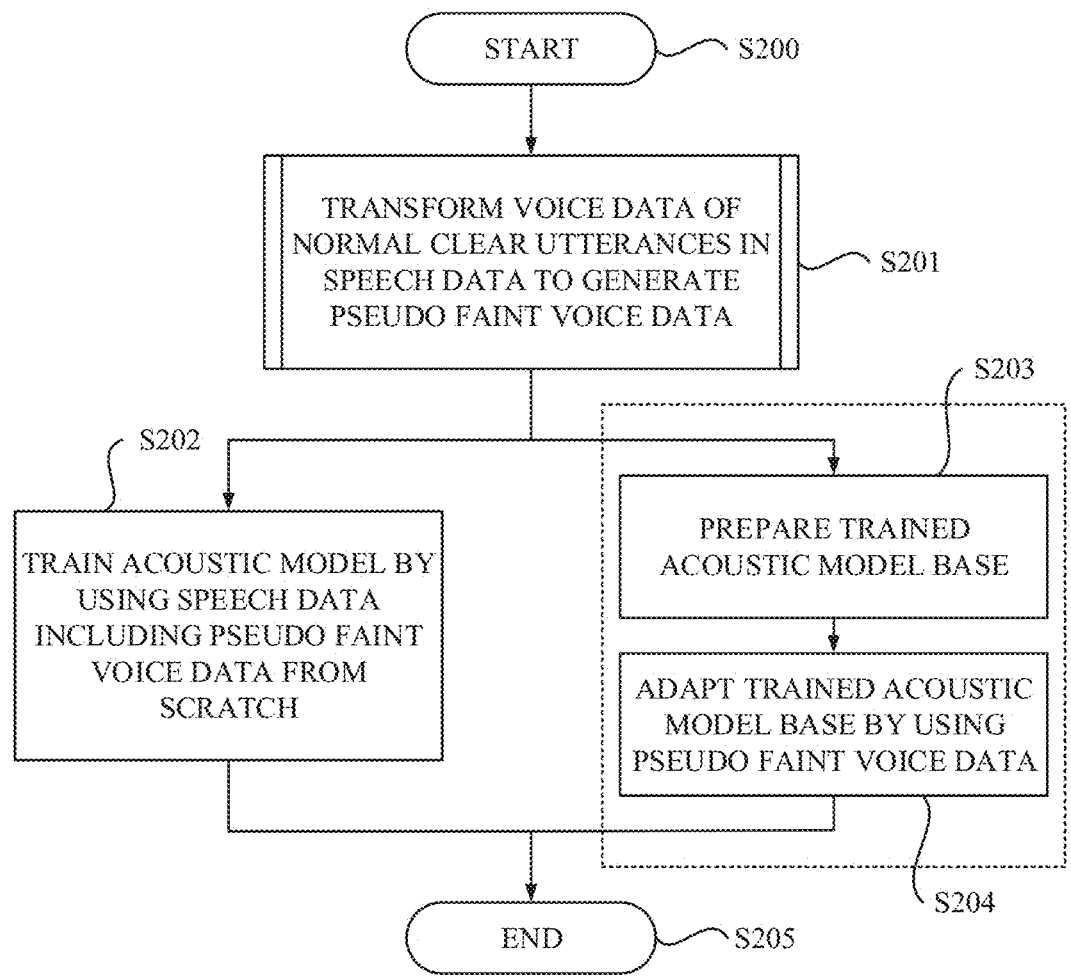
FIG. 6 is a flowchart depicting a process for training an acoustic model according to exemplary embodiments of the present invention.

Referring to FIG. 6, a flowchart depicting processes for training an acoustic model according to exemplary embodiments of the present invention are shown. Note that the flowchart shown in FIG. 6 depicts two processes including one for training an acoustic model 108 from scratch and other for adapting a trained acoustic model base 108B to obtain the acoustic model 108. Also note that the process shown in FIG. 6 may be performed by a processing circuitry such as a processing unit of a computer system that implements the data augmentation system 130 and the acoustic model training system 110 shown in FIG. 1.

The process shown in FIG. 6 may begin at step S200 in response to receiving a request for acoustic model training. At step S201, the processing unit may transform voice data of clear utterances in speech data 120 to generate pseudo faint voice data.

If the process is one for training from scratch, at step S202, the processing unit may train the acoustic model 108 from scratch by using training data that includes the resultant pseudo faint voice data. Note that the original voice data may be associated with label information, thus the resultant voice data and the label information associated with the original voice data may be used to train the acoustic model 108 for speech recognition in step S202. Then, the process may end at step S205.

If the process is one for adaptation, at step S203, the processing unit may prepare an acoustic model base 108B that has been already trained using the speech data 120 other than the pseudo faint voice data. At step S204, the processing unit may train the acoustic model 108 by performing adaptation of the trained acoustic model base 108B using the resultant pseudo faint voice data. Note that since the original voice data may be associated with label information, thus the label information associated with the original voice data may be used with the resultant voice data for supervised adaptation or may not be used with the resultant voice data for unsupervised adaptation in step S204.

According to the aforementioned embodiments, by generating voice data having a particular speaking style, that is pseudo voice data having similar characteristics to the faint voice observed in actual speech recognition task, as data augmentation for acoustic model training, performance of speech recognition for such faint voice may be improved without any harmful side effect on performance for normal voice.

In a particular embodiment, a function that can adapt general-purpose acoustic model to a target environment via a API (Application Programming Interface) may be implemented on speech to text (STT) cloud service. Therefore, provided an automatic training (adaptation) data generator that may enhance specific acoustic conditions.

Note that the languages to which the invention may be applicable is not limited and such languages may include, by no means limited to, Arabic, Chinese, English, French, German, Japanese, Korean, Portuguese, Russian, Spanish for instance.

Experimental Studies

A program implementing the system and process shown in FIGS. 1 and 4 according to the exemplary embodiment was coded and executed for given collection of voice data. Bandpass filter having characteristics shown in FIG. 5A were used to attenuate the high (>4 kHz) and low frequency (<1.5 kHz) components in given voice data. Standard voice activity detection technique was employed to segment the given voice data into plurality of speech segments in a manner such that each speech segment became a word or short phrase. The hamming windows having a length identical to each speech segment was used to reduce the acoustic power at the beginning and the end of each speech segment. Vowels of each speech segment were made longer so as to tune speech speed to be rate randomly selected from 0.6~0.9 times for each utterance.

Experiment 1

250 hours of speech data with transcriptions were prepared as training data set for the acoustic model. The language of utterances included in the speech data was English. Among the 250 hours speech data, 10 hours of noiseless normal speech were picked up as the collection of the voice data used for generating pseudo faint voice data according to the process shown in FIG. 4.

A general-purpose English ASR engine was employed. As for a comparative example (Comparative Example 1), a neural network based acoustic model was trained from scratch by using the training data set without the generated pseudo faint voice data, as baselines. As for an example (Example 1), another neural network based acoustic model was trained from scratch by using the training data set including the generated pseudo faint voice data according to the process shown in FIG. 6 (path for training from scratch).

In the example and the comparative example, after the training of the neural network was completed, the obtained neural network was stored as the acoustic model. The several test sets were prepared. Then, ASR accuracy of the obtained speech recognition models were evaluated for the example and the comparative example by using WER (Word Error Rate) as ASR accuracy metric.

Unless otherwise noted, any portions of the speech recognition model except for contents of training data set (whether or not training data includes generated pseudo faint voice) for the acoustic model were approximately identical between the example and the comparative example. The total amount of the training data set was identical between the example and the comparative example. The final topology of the neural network in the example was also identical to that of the comparative example. The subsequent training method after the pseudo faint voice generation in the example was also identical to that of the comparative example.

The evaluated results of the example and the comparative example using several test sets are summarized as follow:

| Test set in English (16 kHz data) | 250 h without pseudo faint voice augmentation (Comparative Example 1) WER[%] | 250 h with pseudo faint voice augmentation (Example 1) WER[%] |
|---|---|---|
| #1 utterances in reverberant environments | 44.1 | 44.2 |
| #2 spontaneous utterances | 15.1 | 14.7 |

Note that the characteristics of the speech included in the test sets #1 and #2 were different. Thus, the amount of faint voice like utterances was also different across the test sets #1 and #2. By comparison with the result of the comparative example, the example (Example 1) showed improvement in WER for the test set #2. The example (Example 1) also showed same level of WER for other test sets #1, indicating no (at least negligible) side effect on recognition accuracy for clear voice.

It was confirmed that accuracy of speech recognition can be improved using voice data generated by the proposed data generation process as training data for the acoustic model without harmful side effect.

Experiment 2

More than 250 hours of speech with transcriptions were prepared as training data set for acoustic model training. The language of utterances included in the speech data was Japanese. 10 hours of pseudo faint voice data generated from normal speech in the speech data according to the process shown in FIG. 4 was used as augmentation data.

A general-purpose Japanese ASR engine was employed. As for a comparative example (Comparative Example 2), a neural network based acoustic model was trained by using the training data set without the generated pseudo faint voice data as baselines. As for an example (Example 2), the obtained baseline neural network based acoustic model was further adapted by using the generated pseudo faint voice data according to the process shown in FIG. 6 (path for adaptation) in a supervised manner.

The several test sets for voice search task were prepared. The voice search words were uttered by playing a role of novice use to generate faint voice like data as the test sets. Accuracy of the obtained speech recognition models was evaluated for the example and the comparative example by using CER (Character Error Rate) as the accuracy metric.

Unless otherwise noted, any portions of the speech recognition model except for whether or not adaptation using the generated pseudo faint voice was performed were approximately identical between the examples and the comparative examples in Experiment 2. The final topologies of the neural network in the examples were identical to that of the comparative examples.

The evaluated results of the example and the comparative example in Experiment 2 are summarized as follow:

| Test set in Japanese | % CER |
|---|---|
| General purpose ASR as baseline (Comparative Example 2) | 35.9 |
| General purpose ASR after adaptation with the generated pseudo faint voice (Example 2) | 34.0 |

The baseline showed 35.9% CER. By comparison with the result of the comparative example (Comparative Example 2), the example (Example 1) showed improvement of CER by 1.9% (5.3% relative improvement).

It was confirmed that accuracy of speech recognition can be improved by using voice data generated by the proposed data generation process as adaptation data for the acoustic model.

Computer Hardware Component

Figure 7:
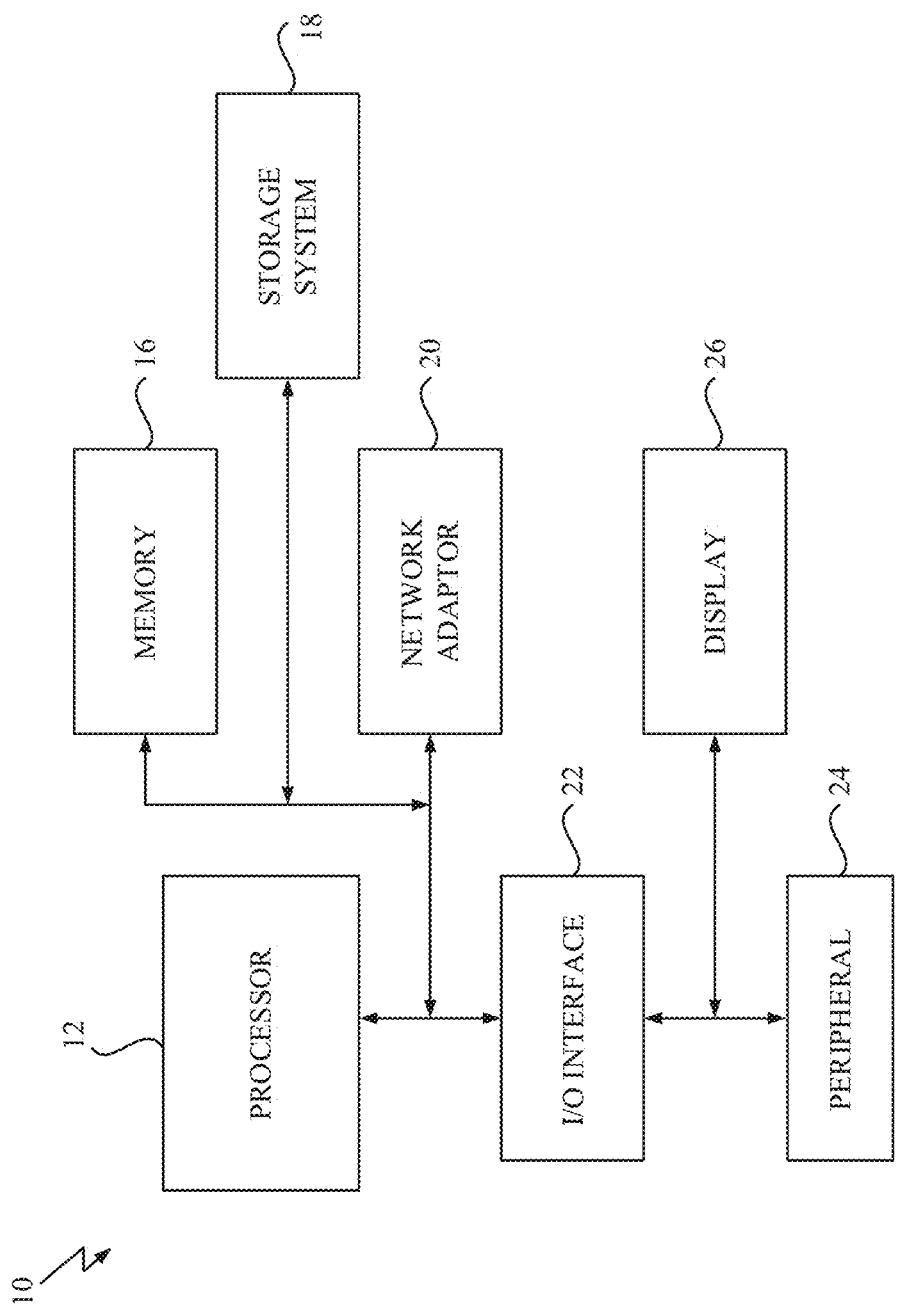
FIG. 7 depicts a schematic of a computer system according to one or more embodiments of the present invention.

Referring now to FIG. 7, a schematic of an example of a computer system 10, which can be used for the speech recognition system 100, is shown. The computer system 10 shown in FIG. 7 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 may be operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, hand-held or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 7, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically may include a variety of computer system readable media. Such media may be any available media that is accessible by the computer system 10, and it includes both volatile and non-volatile media, removable and non-removable media.

The memory 16 may include computer system readable media in the form of volatile memory, such as random access memory (RAM). The computer system 10 may further include other removable/non-removable, volatile/non-volatile computer system storage media. By way of example only, the storage system 18 may be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication may occur via Input/Output (I/O) interfaces 22. Still yet, the computer system 10 may communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, may include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a plurality of voice data having a particular speaking style, the method comprising:
   preparing a plurality of original voice data corresponding to at least one word or at least one phrase;
   attenuating a low frequency component and a high frequency component in the prepared plurality of original voice data,
   wherein a bandpass filter is applied to the prepared plurality of original voice data,
   wherein the applied bandpass filter includes a passband; reducing power at a beginning and an end of the prepared plurality of original voice data, wherein the reducing imitates an unstable controlling airflow based on the attenuated low frequency component in the prepared plurality of original voice data, wherein the window function includes one or more cosine windows, wherein the one or more cosine windows includes at least one Hann window, or at least one Blackman window,
   wherein the window function has a smooth bell-shaped curve when applied to the prepared plurality of original voice data;
   storing a plurality of resultant voice data obtained after the attenuating of the high and low frequency and the reducing power; and
   training an acoustic model from scratch by using a plurality of training data including the stored plurality of resultant voice data,
   wherein the trained acoustic model is an artificial neural network based acoustic model,
   wherein the trained acoustic model improves the accuracy of speech recognition with a minimal harmful side effect in the prepared plurality of original voice data,
   wherein preparing the plurality of original voice data corresponding to at least one word or at least one phrase, further comprises:
   reading a plurality of input voice data corresponding to a plurality of utterances; and dividing the read plurality of input voice data into one or more segments of the prepared plurality of original voice data for each piece of original voice data to include a part corresponding to at least one word or at least one phrase in the read plurality of utterances of the read plurality of input voice data, wherein the attenuating is applied to each piece of original voice data included in the read plurality of input voice data, and the reducing is applied to each piece of original voice data.

2. The method of claim 1, further comprising:
making the prepared plurality of original voice data slower prior to collecting the stored plurality of resultant voice data.

3. The method of claim 2, wherein making the plurality of original voice data slower, further comprises:
stretching a vowel in the prepared plurality of original voice data longer.

4. The method of claim 1, wherein dividing the read plurality of input voice data into one or more segments, further comprises: detecting a plurality of voice activities in the divided plurality of input voice data to detect split points for the one or more segments associated with the prepared plurality of original voice data.

5. The method of claim 1, wherein attenuating a low frequency component and a high frequency component in the prepared plurality of original voice data, further comprises:
attenuating the high frequency component that is greater than or equal to 4 kHz; and
attenuating the low frequency component that is less than or equal to 1.5 kHz.

6. The method of claim 1, wherein reducing power at the beginning and the end of the prepared plurality of original voice data, further comprises:
applying a window function to the prepared plurality of original voice data, wherein the window function having an interval according to the length of the word or the phrase and the reducing being performed prior to or posterior to the attenuating.

7. The method of claim 1, further comprising:
associating the prepared plurality of original voice data with a plurality of label information; and
using the associated plurality of original voice data related to the stored plurality of resultant voice data and the associated plurality of label information to train an acoustic model for speech recognition.

8. The method of claim 1, further comprising:
training the acoustic model by performing adaptation to the trained acoustic model base using the trained plurality of resultant voice data.

9. The method of claim 1, further comprising:
corresponding the prepared plurality of original voice data to at least a part of an utterance having a normal speaking style, wherein the stored plurality of resultant voice data has a style of indistinctly muttering with a low volume.

10. A computer system for generating a plurality of voice data having a particular speaking style, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
preparing a plurality of original voice data corresponding to at least one word or at least one phrase;
attenuating a low frequency component and a high frequency component in the prepared plurality of original voice data,
wherein a bandpass filter is applied to the prepared plurality of original voice data,
wherein the applied bandpass filter includes a passband;
reducing power at a beginning and an end of the prepared plurality of original voice data, wherein the reducing imitates an unstable controlling airflow based on the attenuated low frequency component in the prepared plurality of original voice data, wherein the window function includes one or more cosine windows, wherein the one or more cosine windows includes at least one Hann window, or at least one Blackman window,
wherein the window function has a smooth bell-shaped curve when applied to the prepared plurality of original voice data;
storing a plurality of resultant voice data obtained after the attenuating of the high and low frequency and the reducing power; and
training an acoustic model from scratch by using a plurality of training data including the stored plurality of resultant voice data,
wherein the trained acoustic model is an artificial neural network based acoustic model,
wherein the trained acoustic model improves the accuracy of speech recognition with a minimal harmful side effect in the prepared plurality of original voice data,
wherein preparing the plurality of original voice data corresponding to at least one word or at least one phrase, further comprises:
reading a plurality of input voice data corresponding to a plurality of utterances; and dividing the read plurality of input voice data into one or more segments of the prepared plurality of original voice data for each piece of original voice data to include a part corresponding to at least one word or at least one phrase in the read plurality of utterances of the read plurality of input voice data, wherein the attenuating is applied to each piece of original voice data included in the read plurality of input voice data, and the reducing is applied to each piece of original voice data.

11. The computer system of claim 10, further comprising:
making the prepared plurality of original voice data slower prior to storing the resultant voice data.

12. The computer system of claim 10, further comprising:
reading input voice data corresponding to a plurality of utterances; and
dividing the read plurality of input voice data into one or more segments associated with the prepared plurality of original voice data for each piece of original voice data to include a part corresponding to a word or a phrase in the read plurality of utterances, wherein attenuating is applied to each piece of original voice data included in the read plurality of input voice data, and the reducing is applied to each piece of original voice data.

13. The computer system of claim 10, wherein reducing power at the beginning and the end of the original voice data, further comprises:
applying a window function to the prepared plurality of original voice data, the window function having an interval according to the length of the word or the phrase, the reducing being performed prior to or posterior to the attenuating.

14. The computer system of claim 10, further comprising:
associating the prepared plurality of original voice data with a plurality of label information; and
using the associated plurality of original voice data related to the stored plurality of resultant voice data and the associated plurality of label information to train an acoustic model for speech recognition.

15. A computer program product for generating a plurality of voice data having a particular speaking style, comprising:

one or more non-transitory computer-readable storage medium and program instructions stored on at least one of the one or more tangible storage medium, the program instructions executable by a processor, the program instructions comprising:
program instructions to prepare a plurality of original voice data corresponding to at least one word or at least one phrase;
program instructions to attenuate a low frequency component and a high frequency component in the prepared plurality of original voice data,
wherein a bandpass filter is applied to the prepared plurality of original voice data,
wherein the applied bandpass filter includes a passband;
program instructions to reduce power at a beginning and an end of the prepared plurality of original voice data, wherein the reducing imitates an unstable controlling airflow based on the attenuated low frequency component in the prepared plurality of original voice data, wherein the window function includes one or more cosine windows, wherein the one or more cosine windows includes at least one Hann window, or at least one Blackman window,
wherein the window function has a smooth hell-shaped curve when applied to the prepared plurality of original voice data;
program instructions to store a plurality of resultant voice data obtained after the attenuating of the high and low frequency and the reducing power; and
program instructions to train an acoustic model from scratch by using a plurality of training data including the stored plurality of resultant voice data,
wherein the trained acoustic model is an artificial neural network based acoustic model,
wherein the trained acoustic model improves the accuracy of speech recognition with a minimal harmful side effect in the prepared plurality of original voice data,
wherein preparing the plurality of original voice data corresponding to at least one word or at least one phrase, further comprises:
reading a plurality of input voice data corresponding to a plurality of utterances; and dividing the read plurality of input voice data into one or more segments of the prepared plurality of original voice data for each piece of original voice data to include a part corresponding to at least one word or at least one phrase in the read plurality of utterances of the read plurality of input voice data, wherein the attenuating is applied to each piece of original voice data included in the read plurality of input voice data, and the reducing is applied to each piece of original voice data.

\* \* \* \* \*